US010447565B2

(12) United States Patent
Demeilliez et al.

(10) Patent No.: US 10,447,565 B2
(45) Date of Patent: Oct. 15, 2019

(54) MECHANISM FOR ANALYZING CORRELATION DURING PERFORMANCE DEGRADATION OF AN APPLICATION CHAIN

(71) Applicant: BULL SAS, Les Clayes Sous Bois (FR)

(72) Inventors: Bruno Demeilliez, Montbonnot Saint Martin (FR); José Ignacio Alvarez Marcos, Saint Jean d'Ardieres (FR); Florent Rochette, Seyssinet Pariset (FR)

(73) Assignee: BULL SAS, Les Clayes Sous Bois (FR)

( * ) Notice: Subject to any disclaimer, the term of this patent is extended or adjusted under 35 U.S.C. 154(b) by 235 days.

(21) Appl. No.: 15/338,536

(22) Filed: Oct. 31, 2016

(65) Prior Publication Data

US 2017/0126530 A1    May 4, 2017

(30) Foreign Application Priority Data

Nov. 2, 2015 (FR) ..................... 15 60474

(51) Int. Cl.
*H04L 12/26* (2006.01)
*G06F 11/07* (2006.01)
*G06F 11/34* (2006.01)

(52) U.S. Cl.
CPC ...... *H04L 43/0876* (2013.01); *G06F 11/0709* (2013.01); *G06F 11/079* (2013.01);
(Continued)

(58) Field of Classification Search
CPC ...... H04L 43/0876; H04L 43/04; H04L 43/01
See application file for complete search history.

(56) References Cited

U.S. PATENT DOCUMENTS

| 6,470,385 B1 * | 10/2002 | Nakashima ......... H04L 43/0817 370/390 |
| 2004/0114633 A1 * | 6/2004 | Mallya ..................... H04J 3/07 370/505 |

(Continued)

FOREIGN PATENT DOCUMENTS

| EP | 1 895 416 | 3/2008 |
| EP | 2 330 510 | 6/2011 |

OTHER PUBLICATIONS

French Search Report for corresponding French application No. 1560474.

*Primary Examiner* — Jerry B Dennison
(74) *Attorney, Agent, or Firm* — Hauptman Ham, LLP

(57) ABSTRACT

The present invention relates to a device comprising at least one computer machine and a software for executing a correlation analysis mechanism during performance degradation of an application chain comprising a hardware and software arrangement for storing a measuring repository, said measuring repository comprising a hardware and software arrangement for measuring, by consumption probes, the level of use of each resource on the set of servers constituting the application chain during periods of performance degradation, then storage in a memory of these levels in the measuring repository, in association with the period, said device being characterized in that it further comprises an editing hardware and software arrangement of a configuration repository, a categorization module of the performance problems as a function of the measuring and configuration repositories.

7 Claims, 1 Drawing Sheet

(52) U.S. Cl.
CPC .......... *G06F 11/3452* (2013.01); *H04L 43/04* (2013.01); *H04L 43/12* (2013.01); *H04L 43/14* (2013.01)

(56) References Cited

U.S. PATENT DOCUMENTS

| | | | |
|---|---|---|---|
| 2005/0228856 A1* | 10/2005 | Swildens | G06F 9/50 709/200 |
| 2006/0239199 A1* | 10/2006 | Blair | H04L 45/04 370/248 |
| 2012/0174120 A1* | 7/2012 | Malkiman | G06F 11/3419 719/313 |
| 2012/0185735 A1* | 7/2012 | Sambamurthy | G06F 11/079 714/47.1 |
| 2016/0142475 A1* | 5/2016 | Kathuria | H04L 67/1008 709/203 |
| 2017/0126530 A1* | 5/2017 | Demeilliez | H04L 43/04 |
| 2018/0217912 A1* | 8/2018 | Demeilliez | H04L 41/5009 |

* cited by examiner

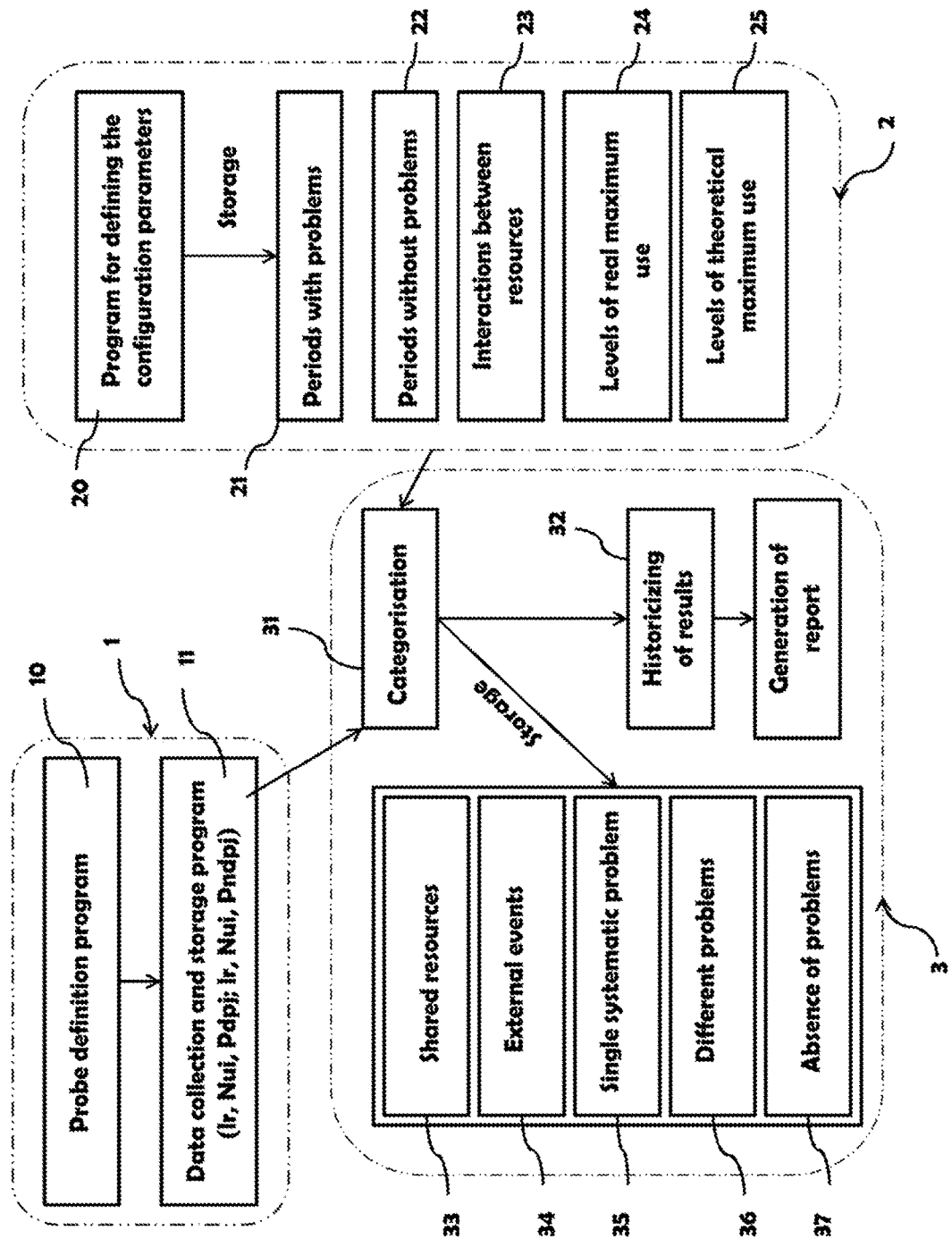

MECHANISM FOR ANALYZING CORRELATION DURING PERFORMANCE DEGRADATION OF AN APPLICATION CHAIN

FIELD OF THE INVENTION

The present invention relates to the field of the monitoring of computer infrastructures, and more particularly the field of analysis of the correlation of symptoms observable on an application linking chain during degradation events of its performance.

BACKGROUND OF THE INVENTION

In production, users of an application can encounter performance problems. The whole application chain then has to be analyzed by searching for the causes of this performance degradation. Analysis especially proceeds via observation of consumption of resources of different servers which comprise the linking chains to detect any saturation of these resources.

It should also be able of comparing the use of these resources when the performance problem(s) occur to ensure that it is always the same problem being faced. In fact, a performance problem generally manifests via a characteristic imprint on the servers of the application chain. If the imprints are similar, it is probable that they are the manifestation of the same application processing.

The use of resources should also be compared when the problem occurs, with the use of resources when the problem is not present to detect the remarkable phenomena characterizing performance degradation.

There are solutions for monitoring servers, but as a single unit.

Application US 2012089724 discloses a system for analyzing performance of a server. A command is sent repetitively over time to the operating system of a server to return a value representative of the consumption of a resource consumed by one or more threads or light processes. The values returned are stored and used to generate a graph for identifying phases of task breakdown and latency periods.

But this system requires repetitive sending of a command and detects only task breakdown and latency periods without being able to deduce correlations. Also, this system therefore requires the sending of repetitive commands which congest the network. Finally, the repetition frequency of commands may not coincide with the start of a performance degradation period, which can generate a loss of information or precision.

Application US2003074161 discloses a system for controlling and evaluating the performance of an application accessible via network, comprising one or more load servers, each capable of simulating the load imposed on the application server by one or more clients. Load servers are configured to execute a particular sequence of server requests so as to evaluate the operation of the server under a specific load. Various performance metrics associated with the functioning of the network and the application server are measured during testing of the server and these metrics are stored with the time when they were measured, to be accessible later by an analysis module identifying correlations between measurements.

But this system is used in the test phase and not in real time and also involves the load simulation and not real load. Therefore, it does not observe the symptoms on an application linking chain during performance degradation events.

Application US 2012/0185735 A1, teaches a method of determining a root cause of a performance problem, which comprises analyzing a plurality of performance indicators/metrics in a first time period and determining that at least one performance indicators/metrics is exhibiting abnormal behavior. The method further comprises analyzing the plurality of performance indicators/metrics over a second time period, the second time period is longer than the first time period, and determining trend information for each performance indicators/metrics over the second time period. The method further comprises correlating the trend information for each performance indicators/metrics with performance problem information stored in a knowledge base, identifying a potential cause of the abnormal behavior based on the correlation, and alerting a user of the potential cause.

However in this document, there is stated that an administrator intervenes in the analysis of indicators/performance metrics. Therefore, the process of determining the performance problems is not carried out in real time as in the previous application.

Moreover, determining the trends of the indicators/metrics is based on threshold values set by the administrator. Therefore, detecting a root cause of a performance problem highly depends on the choice of said administrator.

SUMMARY OF THE INVENTION

The present invention has as its object to obviate certain drawback of the prior art concerning analysis of the correlation of symptoms observable on an application linking chain during degradation events in its performance.

A first goal of the invention relates to a device comprising at least one computer machine and a software for executing a correlation analysis mechanism during performance degradation of an application chain, the device comprising a hardware and software arrangement for storing a measuring repository, said measuring repository comprising a hardware and software arrangement for measuring, by consumption probes, the level of use of each resource on the array of servers constituting the application chain during periods of performance degradation, then storage in a memory of these levels in the measuring repository, in association with the period, said device being characterized in that it further comprises:
- an editing hardware and software arrangement of a configuration repository of the data of the measuring repository;
- a categorisation module of the performance problems as a function of the measuring and configuration repositories;

According to another feature, the configuration repository comprises at least one hardware and software arrangement for listing and storing:
- in a memory, the periods when the performance problems occurred;
- in a memory, the periods when the performance problems did not occur;
- in a memory, the interactions between the resources of the servers which constitute the application chain;
- in a memory, the level of real maximum use for each resource;
- in a memory, the level of theoretical maximum use for each resource.

According to another feature, the categorisation module of the performance problems comprises at least one hardware and software arrangement for carrying out:

creation of a category "shared resources" for a resource used by several servers comprising the associations of the levels of use, by each server, of said resource, this creation being achieved by means of the interactions between the resources of the servers available in the measuring repository in order to create, per resource, a general level of use of said resource stored in a memory in association with the list of all the servers sharing this resource;

comparison of all the measured levels of use of the resources and available in the measuring repository with the levels of real and theoretical maximum use of each resource available in the configuration repository, to create a category "external event", stored in a memory when the measured levels of use of a resource are not coherent with the levels of real and theoretical maximum use of each resource available in the configuration repository, and storage of this resource in the list of resources classified as external event;

comparison of the measured levels of use of resources and available in the measuring repository with the periods when the performance problems occurred and available in the configuration repository to create the categories "single systematic problem" and "different problems", and storage of a resource in a memory dedicated to the "single systematic problems" when the measured levels of use of this resource are identical over different periods, and storage of a resource in a memory dedicated to the "different problems" when the measured levels of use of several resources are different over several periods;

comparison of the levels of use of measured resources available in the measuring repository during periods when the performance problems occurred with the levels of use of the same resources measured during periods when the performance problems did not occur and available in the configuration repository, in order to create the category "absence of problem" and store, in a dedicated memory, each resource for which said levels of use are similar;

generation of a category report.

According to another particular feature, the category report generated by the hardware and software arrangement contains the list of the categories of found performance problem, each of the categories "absence of problem", "external event", "single systematic problem", "different problems", and "shared resources" containing:

a synthetic table of the use of the levels of use of the characteristic resources belonging to the category of the problem;

a detailed table of the levels of resources in saturation or near theoretical or real saturation over the entire linking chain.

According to another particular feature, the probed resources are each cluster instance, each application cache, each size of JMS/JDBC message queues in addition to the processor, inputs/outputs, and memory.

According to another particular feature, the hardware and software arrangement for storing a measuring repository allows defining the monitoring of elements generic to all the applications such as the loads and/or the % of occupations of the resources and/or the response time and/or the processing time and/or the level of CPU use and/or the level of disc reading and/or the level of disc writing.

According to another particular feature, the hardware and software arrangement for storing a measuring repository allows defining the monitoring of more specific elements corresponding to the number of files or open ports, and/or JDBC or JMS message queues and/or the rate of occupation of the file system and/or the rate of operation of the garbage collector for J2EE applications.

Another aim of the invention is to propose a method to obviate certain drawback of the prior art.

This aim is achieved by a method for analysing correlation during performance degradation of an application chain comprising:

a measuring step of the level of use of the resources on the set of servers which constitute the application chain during periods of performance degradation;

a storage step of the level of use of the resources on the set of servers constituting the application chain during periods of non-performance degradation;

said method being characterized in that it also comprises:

a construction step of a configuration repository from the data obtained in the measuring and storage steps of the levels of use of the resources of the set of servers of the application chain;

a categorisation step of each performance problem of the resources from the configuration repository and data obtained in the measuring and storage steps of the levels of use of the resources of the set of servers of the application chain;

a generation step of the categorisation report.

BRIEF DESCRIPTION OF THE DRAWINGS

Other features and advantages of the present invention will appear more clearly upon reading the following description, given with reference to the appended drawings, in which:

FIG. 1 shows a schematic view of the elements of the device for executing a correlation analysis mechanism during performance degradation of an application chain according one embodiment of the invention.

DETAILED DESCRIPTION

In the following, a computer probe is software associated with equipment which takes, manages and provides measurements intended to monitoring equipment intended to inform inter alia of the quality of the network flows or quality of service (QoS), they therefore do not need to send repetitive commands which congest the network. Also the frequency of repetition of commands may not coincide with the start of a period of performance degradation, which can generate loss of information, or precision.

The present invention relates to a device comprising at least one computer and software communicating with the other hardware or software of an application chain for executing a correlation analysis mechanism during the performance degradation of an application chain. The application chain comprises a set of resources ($R_1, \ldots, R_i, \ldots, R_n$) used in all or part by a plurality of servers ($S_1, \ldots, S_j, \ldots, S_m$), the structuring of the application chain is therefore represented in memory by a list of identifiers $lr_i$ of resources associated with each server $S_j$.

In an embodiment, the device comprises at least one hardware and software arrangement for storing a measuring repository (1). The measuring repository (1) comprises at least one hardware and software arrangement (10), for measuring, by consumption probes, the level of use $Nur_i$ of the resources $R_i$ on each of the servers $S_i$ of set of servers $S_j, \ldots, S_m$) which constituting the application chain during periods of performance degradation $Pdp_j$, then storage of these levels $Nur_i$ in a memory (11) of the measuring repository (1), in association with the period $Pdp_j$, to constitute the information doublets ($Nur_i$, $Pdp_j$).

The consumption probes are associated with each resource for providing measuring information or metrics, representing the level of use of the resources (Nur). For each resource, the consumption probes define an identifier lr for the name of the resource and a level of use Nu. The level of use of each resource $Nur_i$ corresponds to an information doublet (lr, $Nu_i$). The same process is conducted for those periods without performance problem for storing triplets (lr, $Nu_i$, $Pndp_j$).

The memory (11) of the measuring repository thus stores triplets (lr, $Nu_i$, $Pdp_j$) or (lr, $Nu_j$, $Pdp_j$), which has the advantage of reducing the number and quantity of information sent by the probes, for reducing congestion on the network and improving precision relative to the solutions known hereinabove.

In some embodiments, the probed resources can be each cluster instance, each application cache, each size of the message queues of application programming interfaces (API) JMS/JDBC in addition to the processor, inputs/outputs, and of the memory. The application programming interface (API) JMS (java messaging service) is a programming interface for sending and receiving messages between applications and, JDBC ("Java DataBase Connectivity") is an API enabling access to databases.

Information such as:
the load on each of the servers calculated as % of occupation of resources (CPU, memory);
the load on inputs/outputs of the discs;
the load on the flow of the network (TCP connection packets and counting of octets);
processing times of some business-critical scenarios or batches, can be provided by the probes.

Generic elements such as: loads, % of occupations of resources, response time, processing time, level of CPU use (Central Processing Unit), level of disc reading, level of disc writing, etc., can be measured by the probes but also more specific elements or events such as the number of files or open ports, JDBC or JMS message queues, the rate of occupation of the file system, the rate of operation of the garbage collector for J2EE applications (Java Enterprise Edition, J2EE being a platform-oriented server for development and execution of distributed applications), etc.

By file system, of a computer hardware architecture for example, we mean a set of principles and rules according to which the files of said computer architecture are organised and handled.

Measuring the levels of use of the resources $Nur_j$ creates a comparison with other levels of use of resources on the server or servers constituting the application chain. The aim of this process is to know whether observations are identical over the set of servers of the application chain. For example, the system could compare the level of disc reading/writing and the level of % wait CPU.

This measuring of levels of use of the resources further allows determining whether the level of use of a given resource complies with that of another resource on one or more servers of the application chain. For example, the system could determine whether the level of disc reading/writing complies with the level of network reading/writing.

In some embodiments, the device also comprises an editing hardware and software arrangement constituting a configuration repository (2).

Said configuration repository (2) comprises at least one hardware and software arrangement (20) for listing and storing:
in a memory (21) the list of periods $Pdp_j$ when the performance problems occurred by comparing the levels of use ($Nu_i$) relative to an acceptable performance threshold (Spa) and by storing all the periods $Pdp_j$ when the performance was below the threshold Spa, i.e, degraded.
in a memory (22) the list of periods $Pndp_j$ when problems of performance degradation did not occur;
in a memory (23) the interactions ($IRpS_i$, $IRpS_j$, ... ) between the resources of the servers constituting the application chain by listing the server $S_i$, resources $R_p$ doublets whereof the levels of use $Nu_i$ have been modified in a time interval determined following variation of the level of use ($Nu_i$) of another resource $R_q$ on another server $S_m$. This is done by searching the period $Pdp_j$ for the resource $R_q$ corresponding to a variation in the level $Nu_j$, then searching in all levels of use Nu of the resource $R_p$ for those which are modified in a time interval determined after the period $Pdp_j$ of the resource $R_q$. In this case the triplet ($Nu_j$, $S_i$, $R_p$) or the doublet ($Nu_j$, $Nur_p$) will be stored for the interaction $IRpS_i$;
in a memory (24) the list of the levels of real maximum use $NumrR_j$ of each resource $R_j$;
in a memory (25) the list of the levels of theoretical maximum use $NumtR_q$ of each resource $R_q$.

The levels of theoretical maximum use of each resource are obtained, for example and without limitation, as a function of charts concerning similar infrastructures (example: network or disc flow).

As to the maximum real levels of use of each resource, they are obtained, for example and without limitation, by analyzing the results of the different probes over the different periods.

Listing these parameters ($Pdp_j$ to $NumrR_j$) makes it possible to make the comparisons of the levels of use of resources Nur with other levels of uses of resources on the server or servers constituting the application chain. This comparison is made over periods $Pdp_j$ during which the performance problems occur with periods $Pndp_j$ without performance problems. The aim is to verify that the resource is or is not at a "normal" level of use and that at this level of use of this resource or of several resources linked by the stored definitions of the interactions, there is the same performance on dependent resources, by storing for each server a list of dependent resources (example: level of disc reading/writing and % wait CPU).

Conducting these correlative analyses automatically, allows reducing the time of incidents in production.

In some embodiments, the device also comprises a categorisation module (3) of the performance problems as a function of the measuring (1) and configuration (2) repositories.

Said categorisation module of the performance problems comprises at least one hardware and software arrangement (31) for creating the categorisation by:
creation of a category "shared resources" stored in a memory (33) for a resource $R_p$ used by several servers ($S_k$, $S_l$, ... ) and comprising the associations of the levels of use $Nur_p$ by each server ($S_k$, $S_l$, ... ), of a resource $R_p$ present on several servers of the application chain,
comparison of all the measured levels of use of the resources $Nur_i$ and available in the measuring repository (1) with the levels of real $NumrR_j$ and theoretical NumtR$_j$ maximum use of each resource R$_j$ available in the configuration repository (2) to create for this resource a category "external event" in a memory (34) of external event;

comparison of the measured levels of use of resources Nur$_i$ and available in the measuring repository (1) with the periods Pdp$_j$ when the performance problems occurred and available in the configuration repository (2), to create the categories "single systematic problem" in a memory (35) or "different problems" in a memory (36) and classify the associated resource in one of these categories;

comparison of the levels of use of measured resources Nur$_i$ available in the measuring repository with the levels measured in the periods Pndp$_j$ when the performance problems did not occur and available in the configuration repository (2) to create for this resource the category "absence of problem" in a memory (37) and classify the associated resource in this category;

generation of a category report;

and historicize these results by means of a historicizing module (32).

Creation of a category "shared resources" in a memory (33) (example: IO network or discs) is made by using a rule which consists of categorising or classifying as "shared resources" any resource R$_j$ whereof the levels of use Nur$_j$ are identified on the different servers (S$_k$, S$_l$, ... ) constituting the application chain, the identifier of said resource R$_j$ being stored in the memory (33) dedicated to the "shared resources".

This creation is done by means of interactions between the resources of the servers available in the memory of the measuring repository (1) in order to create, per resource, a general level of use NuGr$_j$ of said resource R$_j$. Said general level of use NuGr$_j$ is obtained by creating the total sum ΣNurS$_i$ of all the levels Nur$_j$ of a resource used on each server S$_i$, and represents the total measured consumption of the resource R$_j$ on the set of servers.

Creation of a category "external event" in the external event memory (34) is done by the use of the following rule: when the measured levels of use of the resources Nur$_j$ are not coherent with the levels of real NumrR$_j$ and theoretical NumtR$_j$ maximum use of each resource R$_j$ available in the configuration repository (2) (for example saturation of a storage system without link to the level of reading/writing of the array of servers of the application chain), if a given resource R$_j$ has a level Nur$_j$ exceeding the levels of real and theoretical maximum use but is not associated with an identifier lr$_j$, this resource R$_j$ is categorised as "external event" and its identifier stored in said external event memory (34).

Creation of a category "single systematic problem" is done by the use of the following rule: when the measured levels of use of a resource are identical over different periods (Pdp$_j$, Pdp$_n$), if a resource R$_i$ has a level Nur$_i$ greater than the level of theoretical NumtR$_j$ or real NumrR$_j$ maximum on only one of the periods having performance problems, this resource is categorised as "single systematic problem".

Creation for a resource of a category "different problems" is done when the measured levels of use of several resources are different over several periods.

Creation for a resource of a category "absence of problem" is done when the levels of use of the resources measured during periods when the performance problems occurred are similar to the levels of use of resources measured during periods when the performance problems did not occur.

In some embodiments, the category report is generated by a hardware and software arrangement which describes rules for classifying the resources in one of the categories of the list of categories of found performance problem, each of the categories "absence of problem", "external event", "single systematic problem", "different problems" and "shared resources" containing:

a synthetic table of the use of the levels of use of the characteristic resources belonging to the category of the problem (resources in theoretical or real saturation occurring in these periods only);

a detailed table of the levels of resources in saturation or near theoretical or real saturation over the entire linking chain which indexes all the levels Nu and identifiers lr especially to distinguish the resource which it is regularly from that which it is only during performance degradation.

In some embodiments, the present invention relates to a method for analysing correlation during performance degradation of an application chain including:

a measuring step of the level of use of the resources on the array of servers which comprise the application chain during periods of performance degradation;

a storage step of the level of use of the resources on the array of servers constituting the application chain during periods of non-performance degradation;

said method being characterized in that it also comprises:

a construction step of a configuration repository (2) from the data obtained in the measuring and storage steps of the levels of use of the resources of the set of servers of the application chain;

a categorisation step of each performance problem of one or more resources from the configuration repository (2) and the data obtained in the measuring and storage steps of the levels of use of the resources of the set of servers of the application chain;

a generation step of the categorisation report.

The present application describes various technical features and advantages with reference to the figures and/or various embodiments. Those skilled in the art will understand that the technical features of a given embodiment can in fact be combined with features of another embodiment unless explicitly stated otherwise, or unless the combination does not provide a solution to at least one of the technical problems mentioned in the present application. In addition, the technical features described in a given embodiment can be isolated from the other technical features of this embodiment unless explicitly stated otherwise.

It must be obvious to those skilled in the art that the present invention allows embodiments in many specific forms without departing from the field of application of the invention as claimed. Consequently, the present embodiments must be considered as illustrations, but can be modified in the area defined by the scope of the appended claims, and the invention must not be limited to the details given above.

The invention claimed is:

1. A device comprising at least one computer machine and a software for executing a correlation analysis mechanism during performance degradation of an application linking chain, the device comprising a hardware and software arrangement for storing a measuring repository, said measuring repository comprising a hardware and software arrangement for measuring, by consumption probes, a usage level of each resource on an array of servers constituting the application linking chain during periods of performance degradation, then storing these levels in a memory of the measuring repository, in association with the periods of performance degradation, wherein the device further comprises:

an editing hardware and software arrangement of a configuration repository of data from the measuring repository; and a categorisation module of performance problems as a function of the measuring and configuration repositories, wherein the categorisation module of the performance problems comprises at least one hardware and software arrangement for carrying out:

creation of a category "shared resources" for a resource, among the resources on the array of servers, used by several servers, among the array of servers, comprising associations of usage levels, by each server, of said resource, this creation being achieved by means of interactions between the resources of the servers available in the measuring repository in order to create, per resource, a general usage level of said resource stored in a first memory of the categorisation module in association with a list of all the servers sharing this resource;

comparison of all the measured usage levels of the resources and available in the measuring repository with real and theoretical maximum usage levels of each resource available in the configuration repository, to create a category "external event", stored in a second memory of the categorisation module, when the measured usage levels of a resource are not coherent with real and theoretical maximum usage levels of each resource available in the configuration repository, and storage of this resource in a list of resources classified as external event;

comparison of the measured usage levels of resources and available in the measuring repository with the periods when the performance problems occurred and available in the configuration repository to create the categories "single systematic problem" and "different problems", and storage of a resource in a third memory of the categorisation module dedicated to the "single systematic problems" when the measured usage levels of this resource are identical over different periods, and storage of a resource in a fourth memory of the categorisation module dedicated to the "different problems" when measured usage levels of several resources are different over several periods;

comparison of the usage levels of measured resources available in the measuring repository during periods when the performance problems occurred with the usage levels of the same resources measured during periods when the performance problems did not occur and available in the configuration repository, in order to create the category "absence of problem" and store, in a dedicated fifth memory of the categorisation module, each resource for which said usage levels are similar; and generation of a category report.

2. The device according to claim 1, wherein the configuration repository comprises at least one hardware and software arrangement for listing and:

storing in a first memory of the configuration repository, the periods when the performance problems occurred;

storing in a second memory of the configuration repository, the periods when the performance problems did not occur;

storing in a third memory of the configuration repository, interactions between the resources of the servers which constitute the application linking chain;

storing in a fourth memory of the configuration repository, a real maximum usage level for each resource;

storing in a fifth memory of the configuration repository, a theoretical maximum usage level for each resource.

3. The device according to claim 1, wherein the category report generated by the hardware and software arrangement contains a list of the categories of found performance problem, each category of the categories "absence of problem", "external event", "single systematic problem", "different problems" and "shared resources" containing:

a synthetic table of the use of the usage levels of the characteristic resources belonging to the category;

a detailed table of levels of resources in saturation or near theoretical or real saturation over the entire application linking chain.

4. The device according to claim 1, wherein the resources, which have been probed, are each cluster instance, each application cache, each size of JMS/JDBC message queues in addition to the processor, inputs/outputs, and memory.

5. The device according to claim 1, wherein the hardware and software arrangement for storing a measuring repository, by means of measuring sensors, is configured to monitor elements generic to all the applications such as the loads and/or the % of occupations of the resources and/or the response time and/or the processing time and/or the level of CPU use and/or the level of disc reading and/or the level of disc writing.

6. The device according to claim 1, the hardware and software arrangement for storing a measuring repository is further, by means of measuring sensors, configured to monitor elements corresponding to the number of files or open ports, and/or JDBC or JMS message queues and/or the rate of occupation of the file system and/or the rate of operation of the garbage collector for J2EE applications.

7. A method for analysing correlation during performance degradation of an application linking chain comprising:

a measuring step of usage levels of resources on a set of servers which constitute the application linking chain during periods of performance degradation;

a storage step of the usage levels of the resources on the set of servers which constitute the application linking chain during periods of nonperformance degradation;

wherein said method also comprises:

a construction step of a configuration repository from data obtained in the measuring and storage steps of the usage levels of the resources of the set of servers of the application linking chain;

a categorisation step of each performance problem of one or more resources from the configuration repository and the data obtained in the measuring and storage steps of the usage levels of the resources of the set of servers of the application linking chain, wherein the categorisation step further comprises:

creating a category "shared resources" for a resource, among resources on a array of servers, used by several servers, among the array of servers, comprising associations of usage levels, by each server, of the resource, this creation being achieved by means of interactions between the resources of the array of servers obtained in measuring and storage steps in order to create, per resource, a general usage levels of the resource stored in a first memory of a categorisation module in association with a list of all the array of servers sharing this resource;

comparing all the usage levels of the resources and obtained in the measuring and storage steps with real and theoretical maximum usage levels of each of the resources available in the configuration repository, to create a category "external event", stored in a second memory of the categorisation module, when the usage levels of a resource are not coherent with real and theoretical maximum usage levels of each resource available in the configuration repository, and storage of this resource in a list of resources classified as external event;

comparing the usage levels of the resources and obtained in the measuring and storage steps with the periods when the performance problems occurred and available in the configuration repository to create categories "single systematic problem" and "different problems", and storage of a resource in a third memory of the categorisation module dedicated to the "single systematic problems" when the usage levels of this resource are identical over different periods, and storage of a resource in a fourth memory of the categorisation module dedicated to the "different problems" when the usage levels of several resources are different over several periods;

comparison of the usage levels of the resources obtained in the measuring and storage steps during periods when the performance problems occurred with the usage levels of the same resources measured during periods when the performance problems did not occur and available in the configuration repository, in order to create category "absence of problem" and store, in a dedicated fifth memory of the categorisation module, each resources for which the usage levels are similar; and generating a categorisation report.

* * * * *